United States Patent Office 2,873,139
Patented Feb. 10, 1959

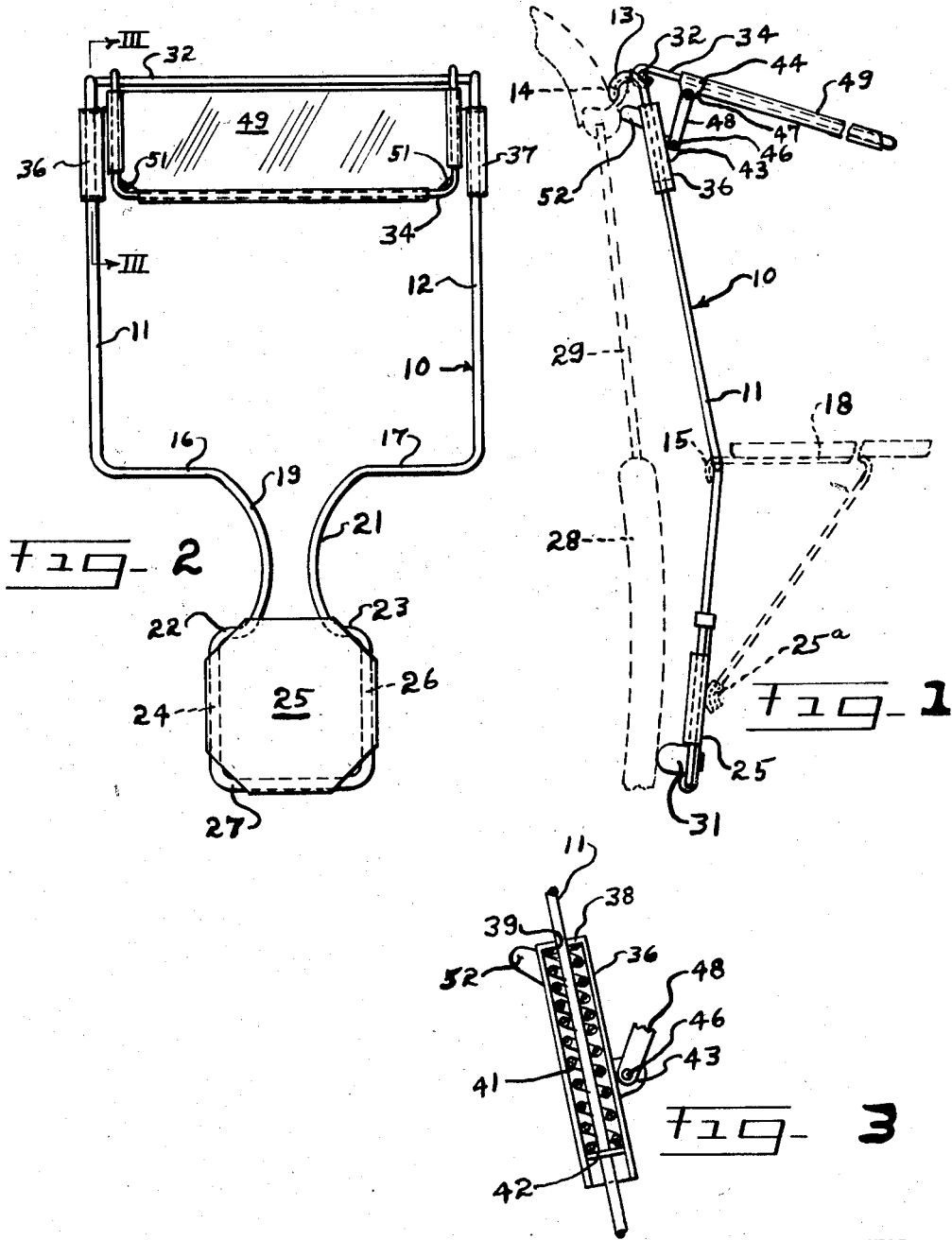

2,873,139

CANOPY FOR AUTOMOBILE SERVING TRAY HOLDER

Robert L. Borders, Jr., and Geraldine Sitz, Gadsden, Ala.

Original application July 22, 1955, Serial No. 523,649, now Patent No. 2,774,641, dated December 18, 1956. Divided and this application October 22, 1956, Serial No. 617,496

4 Claims. (Cl. 296—44)

This invention relates to an automobile serving tray holder, such as are used in serving food or refreshments to persons seated in automobiles and is a division of our co-pending application Serial No. 523,649, filed July 22, 1955, now Patent No. 2,774,641, and entitled, Automobile Serving Tray Holder.

An object of our invention is to provide an automobile serving tray holder which may be readily attached to the gutter of an automobile whereby there is no interference with the raising and lowering of the automobile window.

A more specific object of our invention is to provide an automobile serving tray holder which shall include a canopy or awning to protect the tray from the weather, and which is foldable to lie flat against the holder when not in use.

As is well known, the service of food and other refreshments by "drive in" restaurants to persons seated in automobiles has grown into an enormous business during the past few years. In all such establishments with which we are familiar it has been the practice to provide a tray which hooks over the window sill of the automobile and which has a supporting leg bearing against the side of the automobile. When so placed the automobile window cannot be raised and this creates discomfort in cold or rainy weather; also, since air conditioners are being installed in automobiles this invention will afford comfort in summer weather.

The foregoing and other difficulties are overcome in accordance with our invention wherein we provide a supporting frame which is adapted to support a serving tray and is provided with hook members at the upper end thereof disposed to hook over the gutter of an automobile. Sleeves are slidably mounted adjacent each side of the supporting frame beneath the hook members and are resiliently urged upwardly whereby the gutter is clamped between the hook members and the sleeves. A canopy or awning is pivotally connected at the upper end of the frame and is connected to the sleeve members by supporting brace members which are pivotally connected at one end to the awning and at the other end to the supporting frame whereby upon outward movement of the awning, the sleeves are free to move upwardly into engagement with the undersurface of the gutter and upon inward movement of the awning the sleeves are moved out of engagement with the gutter. Also, the connections between the supporting brace members and the awning pass dead center with respect to the connections between the supporting brace members and the sleeves when the awning is folded inwardly, thereby maintaining the awning in a collapsed position when not in use.

A device embodying features of our invention is shown in the accompanying drawing forming a part of this application, in which:

Fig. 1 is a side elevational view of the device showing the manner in which it is attached to an automobile, a portion of the automobile being shown in dotted lines;

Fig. 2 is a front elevation of the device; and,

Fig. 3 is a sectional view taken along the line III—III of Fig. 2.

Referring now to the drawing for a better understanding of our invention, we show a supporting frame 10 having two parallel vertically extending arms 11 and 12. The upper ends of the arms 11 and 12 are bent over to provide hooks 13 which are adapted to hook over the window gutter of an automobile, as shown at 14 in Fig. 1. The lower ends of the arms 11 and 12 are bent inwardly to provide horizontal portions 16 and 17 which form supports for the arms 15 of a conventional type serving tray shown in dotted lines at 18.

The inner ends of the horizontal portions 16 and 17 are bent downwardly as at 19 and 21, as shown in Fig. 2, to provide a handle for mounting the device on an automobile. The lower ends of the portions 19 and 21 are bent outwardly as at 22 and 23, downwardly as at 24 and 26, and then inwardly as at 27 to form a closed lower end for the frame. A cover plate 25 formed of a suitable material such as plastic, is secured to the closed lower end of the frame 10 in position to be engaged by the supporting leg 25a of the tray 18. Preferably, the edges of the cover plate 25 are rolled over the downwardly extending portions 24 and 26 and the inwardly extending portion 27 of the frame 10, as shown in Fig. 2. As shown in Fig. 1, the frame 10 is bent outwardly away from the body of the automobile, as indicated in dotted lines at 28, so as to position the frame and the tray supported thereby outwardly of the automobile window indicated at 29. Secured to the lower end of the frame 10 is an inwardly extending pad 31 formed of a resilient material, such as rubber or the like, which engages the side of the automobile, as shown in Fig. 1.

Secured to the arms 11 and 12 adjacent the hooks 13 is a connecting frame member in the form of a bar 32 which adds rigidity to the frame 10. Hingedly connected to the bar 32 is a U-shaped awning frame 34 having its free ends bent over so as to encircle the bar 32, as shown in Fig. 1, whereby the frame 34 is adapted to swing outwardly of the frame 10.

Mounted for sliding movement on the arms 11 and 12 are sleeves 36 and 37, respectively. The upper end of each sleeve is closed by a cover member 38 having a suitable opening 39 therein for receiving the arm 11, or 12, as the case may be. The lower ends of the sleeves 36 and 37 are left open, as shown in Fig. 3. Surrounding the arms 11 and 12 within the sleeves 36 and 37 are compression springs 41. Spring abutments 42 are secured to the arms 11 and 12 in position to engage the lower ends of the springs 41 whereby the springs are seated between the same and the cover members 38. Mounted on the sleeves 36 and 37 are outwardly projecting brackets 43 and mounted on the awning frame 34 opposite the brackets 43 are inwardly extending brackets 44. Pivotally connected to the brackets 43 and 44 by means of pivot pins 46 and 47, respectively, are supporting links 48. The pivot pins 47 are positioned so that when the awning frame 34 is moved inwardly or lowered, they pass dead center with respect to the pivot pins 43 and the connecting bar 32, thereby causing the compression spring 41 to hold the awning frame in closed position against the frame 10. The awning frame 34 is of such length that when folded downwardly it rests against the horizontal portions 16 and 17 of the frame 10. The awning frame 34 is covered by a suitable cover 49, which is preferably inverted with the edges rolled over the frame 34 to form a catch basin for rain. Suitable openings 51 are provided in the lower corners of the cover 49 for discharging water which collects in the basin.

Mounted on the upper ends of the sleeves 36 and 37 are inwardly extending catch members 52 which are disposed to engage the undersurface of the gutter 14, as shown in Fig. 1. The catch members 52 thus hold the hooks 13 in engagement with the gutter 14 while the awning frame 34 is in its outer or raised position. As the awning frame 34 is moved inwardly or lowered, the sleeves 36 and 37 together with their catch members 52 move downwardly out of engagement with the gutter 14, thus permitting the frame 10 to be disengaged from the automobile. The catch members 52 and the hooks 13 are covered by a suitable resilient material to prevent damage to the gutter 14.

From the foregoing description, the operation and use of our serving tray holder will be readily understood. With the awning frame 34 in its inner or lowered position against the frame 10, the catch members 52 are positioned a substantial distance from the hooks 13 thus permitting the hooks to be placed over the gutter, as shown in Fig. 1. With the hooks 13 in engagement with the gutter 14, the awning frame 34 is moved outwardly to raised position whereupon the catch members 52 move upwardly into engagement with the undersurface of the gutter, thereby locking the device to the automobile. The resilient pad 31 at the lower end of the frame 10 engages the sides of the automobile whereby the entire frame is held in spaced relation to the automobile. With the device thus attached to the automobile, the window 29 is free to move to raised or lowered position. The serving tray holder is attached to the frame 10 by inserting the arms 15 of the serving tray over the horizontal portions 16 and 17 of the frame 10 with the lower leg 25a of the serving tray pressing against the cover plate 25 at the lower end of the frame 10. To remove the holder from the automobile, the awning frame 34 is moved inwardly to lowered position whereupon the catch members 52 move downwardly with the sleeve members 36 and 37 out of engagement with the gutter 14, thus permitting the hooks 13 to be disengaged from the the gutter.

From the foregoing, it will be seen that we have devised an improved automobile serving tray holder which is adapted for use on automobiles without interfering in any way with the raising and lowering of the automobile windows. By providing resilient covers for the hooks 13 and the catch members 52 and a resilient pad 31 at the bottom of the frame, the surface of the automobile on which the device is attached is not marred or scratched. Also, the awning at the upper end of the frame protects the serving tray from the weather and serves as a latch to hold the device attached to the automobile while the awning is in raised position. Furthermore, when the awning is moved inwardly to lowered position, it lies flat against the supporting frame 10, thus requiring a minimum of space for storing the same. Furthermore, by providing the sleeve members which are connected to each other by a common actuating member, such as the awning frame 34, a person may readily unlatch both sides of the device from the gutter with one hand while the other hand grasps the handle portions 19 and 21, thus permitting the holder to be unlatched and removed easily from the automobile.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. In a canopy for a serving tray holder for use with an automobile having a window with a gutter above it, a pair of vertically extending arms, hook members at the upper ends of said arms disposed to hook over the gutter, a cover member hingedly connected to said arms adjacent the upper ends thereof, a supporting brace member pivotally connected at one end to the cover member and at the other end pivotally and yieldably connected to the arms whereby the cover member may be folded downwardly against the arms and when folded the first mentioned pivoted connection moves past dead center with respect to the other pivotal connection, and catch members mounted on the arms and disposed to engage beneath the gutter and co-act with the hook members to secure the arms to the gutter when the cover member is folded upwardly from the arms.

2. In a canopy for a serving tray holder for use with an automobile having a window with a gutter above it, a pair of vertically extending arms, hook members at the upper ends of said arms disposed to hook over the gutter, sleeves slidably mounted on said arms, catch members on the sleeves disposed to engage beneath the gutter and when so engaged co-acting with the hook members to secure the arms to the gutter, means operatively interposed between the sleeves and the arms resiliently urging the sleeves upwardly toward the hook members, a cover member hingedly connected to the upper end of the arms, and a supporting brace member pivotally connected at one end to the cover member and at the other end pivotally connected to the sleeves whereby the cover member may be folded downwardly against the arms and when folded the first mentioned pivotal connection moves past dead center with respect to the other pivotal connection and the catch members are moved out of engagement with the gutter.

3. In a canopy for a serving tray holder for use with an automobile having a window with a gutter above it, a pair of parallel vertically extending arms, hooks at the upper ends of said arms adapted to hook over the gutter, sleeves mounted adjacent the upper ends of said vertically extending arms, springs biasing the sleeves upwardly, an awning pivoted adjacent the upper ends of the vertically extending arms to swing outwardly, a bracket on each sleeve, a bracket on each side of the awning opposite the bracket on the sleeve adjacent thereto, and a supporting link pivotally connecting each bracket on the awning to the bracket on the sleeve adjacent thereto, whereby upon outward movement of the awning the sleeves are free to move upwardly into engagement with the undersurface of the gutter and upon inward movement of the awning the sleeves are moved out of engagement with said gutter.

4. A holder as defined in claim 3 in which the connections between the links and the brackets on the awning pass dead center with respect to the connections between the links and the brackets on the sleeves when the awning is folded inwardly.

References Cited in the file of this patent

UNITED STATES PATENTS

| | | |
|---|---|---|
| 1,617,964 | Richards | Feb. 15, 1927 |
| 2,020,074 | McGinley | Nov. 5, 1935 |
| 2,314,550 | Olman | Mar. 23, 1943 |
| 2,447,043 | Hedger | July 5, 1949 |
| 2,593,909 | Moreland | Apr. 22, 1952 |
| 2,612,219 | Nelson | Sept. 30, 1952 |
| 2,631,912 | Pryor | Mar. 17, 1953 |
| 2,657,089 | Kaul | Oct. 27, 1953 |
| 2,682,438 | Davis | June 29, 1954 |
| 2,683,507 | Coven, et al. | July 13, 1954 |
| 2,774,641 | Borders et al. | Dec. 18, 1956 |
| 2,796,289 | Tocchetto | June 18, 1957 |